US006944479B2

(12) United States Patent
Andaker et al.

(10) Patent No.: US 6,944,479 B2
(45) Date of Patent: Sep. 13, 2005

(54) USING CALL ESTABLISHMENT SIGNALING TO REQUEST DATA

(75) Inventors: Kristian L. M. Andaker, Bellevue, WA (US); David P. Limont, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 451 days.

(21) Appl. No.: 10/179,495

(22) Filed: Jun. 24, 2002

(65) Prior Publication Data

US 2004/0204030 A1 Oct. 14, 2004

(51) Int. Cl.[7] .............................................. H04B 1/38
(52) U.S. Cl. ...................... 455/560; 455/11.1; 455/502; 379/218.01
(58) Field of Search .............................. 455/11.1, 560, 455/7, 502, 422.1; 709/204; 379/218.01

(56) References Cited

U.S. PATENT DOCUMENTS

| 6,298,234 | B1 | 10/2001 | Brunner ...................... 455/432 |
| 2002/0165016 | A1 | 11/2002 | Lee ............................. 455/575 |
| 2003/0139929 | A1 * | 7/2003 | He et al. .................. 704/270.1 |
| 2003/0224722 | A1 * | 12/2003 | Martin et al. .............. 455/11.1 |
| 2004/0058710 | A1 * | 3/2004 | Timmins et al. ............ 455/560 |
| 2004/0184593 | A1 * | 9/2004 | Elsey et al. ............ 379/218.01 |
| 2004/0193683 | A1 * | 9/2004 | Blumofe ..................... 709/204 |

FOREIGN PATENT DOCUMENTS

| WO | WO 01/47301 A2 | 6/2001 | ............ H04Q/7/22 |
| WO | WO 01/72007 A1 | 9/2001 | ........... H04L/29/06 |

OTHER PUBLICATIONS

SS7 Gateway for Inter–Working Between an IP Network and a Telephone Network, T. Murakami, M. Aihara, N. Shimamoto and K. Ono, Fifth Asia–Pacific Conference on Communications and Fourth Optoelectronics and Communications Conference. APCC/OECC'99. Proceedings. Conference—Vitality to the New Century(IEEE Cat. No.99EX379), Publ. by Beijing Univ. Posts & Telecommun, Beijing, China, 1999, vol. 1, pp. 57–60.

Remote Data Acquisition Phones Home, S. Resweber, Sensors, Publ. by Helmers Publishing, USA, Feb. 1999, vol. 16, No. 2, pp. 28, 30–3.

* cited by examiner

*Primary Examiner*—Lester G. Kincaid
*Assistant Examiner*—Phuoc Doan
(74) *Attorney, Agent, or Firm*—Workman Nydegger (57) ABSTRACT

A mobile computer system requests data by requesting the establishment of a voice connection to a voice server, such as, for example, by selecting a telephone number. The mobile computer system provides an identifier (e.g. caller identification information) that identifies the mobile computer system and a called number that represents data of interest to the mobile computer system. After receiving the identifier and the called number, the voice server may deny the request for establishment of the voice connection. The voice server identifies the data of interest, which may be stored at the voice server or at a data server associated with the voice server, based on the called number. The identifier is mapped to a data address associated with the mobile computer system and the data of interest is sent to the data address. The mobile computer system receives the data of interest over a data connection.

38 Claims, 4 Drawing Sheets

USING CALL ESTABLISHMENT SIGNALING TO REQUEST DATA

BACKGROUND OF THE INVENTION

1. The Field of the Invention

The present invention relates to accessing data at mobile computer systems. More specifically, the present invention relates to systems, methods, and computer program products for using call establishment signaling to request data.

2. Background and Relevant Art

Mobile computing devices, such as cellular phones and personal digital assistants ("PDAs"), often access data in wireless environments. For example, significant portions of the World Wide Web are accessible to mobile computing devices over wireless networks that are managed by Mobile Carrier Service Providers. Wireless networks may also enable mobile computing devices to access personal information, such as, for example, appointments, contact lists, and electronic messages, stored at servers associated with the wireless networks. Mobile computing devices often use these same wireless networks to establish voice connections to other devices.

Establishing a voice connection to another device is a relatively simple procedure. A user manipulates input controls (e.g. a real or virtual keypad) of the mobile computing device to select a telephone number. Input controls may be manipulated to select a sequence of individual numbers or to select a previously entered and saved telephone number from an address book. After the telephone number is selected, the user may "send" the telephone number by selecting an appropriate control (e.g. a send button). This causes a called device (e.g. another mobile computing device or standard telephone) associated with the dialed telephone number to indicate (e.g. by ringing) that establishment of a voice connection is being requested. If a user answers the called device (e.g. by taking the called device off hook or selecting a receive button), a voice connection is established between the mobile computing device and the called device.

Unfortunately, accessing data at mobile computing devices is often not so simple. Mobile computing devices typically access data in wireless environments using a request/receive model. That is, a mobile computing device sends a data request over a wireless network and the requested data is subsequently received back at the mobile computing device over the wireless network.

In some cases, a user of a mobile computing device may request access to personal information stored at a server. To configure such a request, a user may be required to navigate a series of menus to an inbox and then compose a specially formatted Short Message Service ("SMS") message. Navigating a series of menus and composing a message using the often limited input capabilities of a mobile computing device is burdensome to a user. Such actions may consume a considerable amount of time and may require significantly more keypad selections than are required to dial a telephone number.

Some mobile computing devices are configured to access data from the Web using the Wireless Application Protocol ("WAP"). To access data from the Web, a user of a mobile computing device would, at a minimum, have to manipulate input controls to open a browser and navigate a series of Uniform Resource Locator ("URLs") to reach data of interest. As each URL is selected, a new Web page may be displayed, taking some amount of time to load. Thus, browsing, similar to sending SMS requests, may consume a substantial amount of time and may require significantly more keypad selections than are required to dial a telephone number.

Therefore, what are desired are systems, methods, and computer program products, for causing a mobile computing device to request data in a more efficient manner.

BRIEF SUMMARY OF THE INVENTION

Methods, systems, and computer program products are described for using call establishment signaling to request data. In particular, a mobile computer system issues a request for establishment of a voice connection to a voice server. Such a request may result when a user of the mobile computer system causes the mobile computer system to dial a telephone number (e.g. selecting a telephone number by manipulating dialing controls or from an address book). A request for a voice connection may be issued using any of a wide variety of wireless standards, such as, for example, the Global System for Mobile Communications ("GSM") standard. The issued request may be routed through a number of wireless voice networks, such as, for example, GSM or Time-Division Multiple Access ("TDMA") networks and a number of wired networks, such as, for example, Public Service Telephone Networks ("PSTN"), before reaching the voice server.

The mobile computer system provides an identifier that identifies the mobile computer system. The identifier may be included in caller identification information, such as, for example, as a Mobile Subscriber ("MSISDN") number. Caller identification information may be appended to the request for establishment of a voice connection by a component included in a wireless network. In some cases, the mobile computer system may expressly provide an identifier in a request. The voice server receives the request, whether it be an identifier that was appended to or expressly provided in the request for establishment of a voice connection.

The mobile computer system also provides a called number that represents data of interest to the mobile computer system. When an issued request for a voice connection is received, the voice server identifies the called number that was provided by the mobile computer system. It may be that the mobile computer system expressly includes the called number in a request to establish a voice connection. Thus, the called number is more easily identifiable by the voice server. However, it may also be that an identifier is not expressly included and that the voice server interprets electrical characteristics or data associated with the request to identify the called number.

In some cases, a voice server may utilize a single number to receive requests for voice connections. In these cases, the called number may be identified implicitly, just by receiving a request for a voice connection. In other cases, a voice server may utilize multiple numbers to receive requests for voice connections. In these other cases, the called number may be identified by the detection of electrical signals (e.g. ring detection) and/or by call setup information associated with signaling protocols (e.g. Session Initiation Protocol ("SIP")).

The voice server identifies data of interest to the mobile computer system based on the called number. A specific called number may be indicative of a request for specific data, such as, electronic mail data, financial data, or instant messaging data. For example, a user of a mobile computer system may dial a specific telephone number to request a current quote for a particular stock. The voice server may cause the data of interest to be sent to the mobile computer system over a data connection. Data may be sent from the voice server or from a data server that is associated with the voice server. The mobile computer system receives the data of interest over the data connection.

Requesting data through the use of call establishment signals may significantly reduce the input device manipulation and time needed to request data. A user need only dial a telephone number to request and subsequently receive data of interest to the user.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to systems, methods, and computer program products for causing a mobile computer system to request access to data using call establishment signals and then receive the requested data over a data connection. A mobile computer system issues a request to establish a voice connection to a voice server. The mobile computer system provides an identifier that identifies the mobile computer system and a called number that represents data of interest to the mobile computer system.

The voice server receives the identifier and uses the identifier to formulate a return address to the mobile computer system. The voice server identifies the called number that was provided by the mobile computer system and, based on the called number, identifies data of interest to the mobile computer system. Alternatively, the voice server may pass the identifier and called number to an associated data server. The data server may formulate a return data address for the mobile computer system and identify data of interest to the mobile computer system. The identified data of interest is then sent to the mobile computer system (by the voice server and/or the data server) over a data connection and received at the mobile computer system.

The embodiments of the present invention may comprise a general-purpose or special-purpose computer system including various computer hardware components, which are discussed in greater detail below. Embodiments within the scope of the present invention also include computer-readable media for carrying or having computer-executable instructions, computer-readable instructions, or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as any architecture where two or more computer systems may exchange data. Exchanged data may be in the form of electrical signals that are meaningful to the two or more computer systems. When data is transferred or provided over a network or another communications connection (either hardwired, wireless, or a combination of hardwired or wireless) to a computer system or computer device, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions.

In this description and in the following claims, a "computer system" is defined as one or more software modules, one or more hardware modules, or combinations thereof, which work together to perform operations on electronic data. For example, the definition of computer system includes the hardware components of a personal computer, as well as software modules, such as the operating system of the personal computer. The physical layout of the modules is not important. A computer system may include one or more computers coupled via a computer network. Likewise, a computer system may include a single physical device (such as a mobile phone or Personal Digital Assistant "PDA") where internal modules (such as a memory and processor) work together to perform operations on electronic data.

Those skilled in the art will appreciate that the invention may be practiced in network computing environments with many types of computer system configurations, including mobile telephones, PDA's, pagers, hand-held devices, laptop computers, personal computers, multi-processor systems, microprocessor-based or programmable consumer electronics, network PCs, minicomputers, mainframe computers, and the like. The invention may also be practiced in distributed computing environments where local and remote computer systems, which are linked (either by hardwired links, wireless links, or by a combination of hardwired or wireless links) through a communication network, both perform tasks. In a distributed computing environment, program modules may be located in both local and remote memory storage devices.

Figure 1:
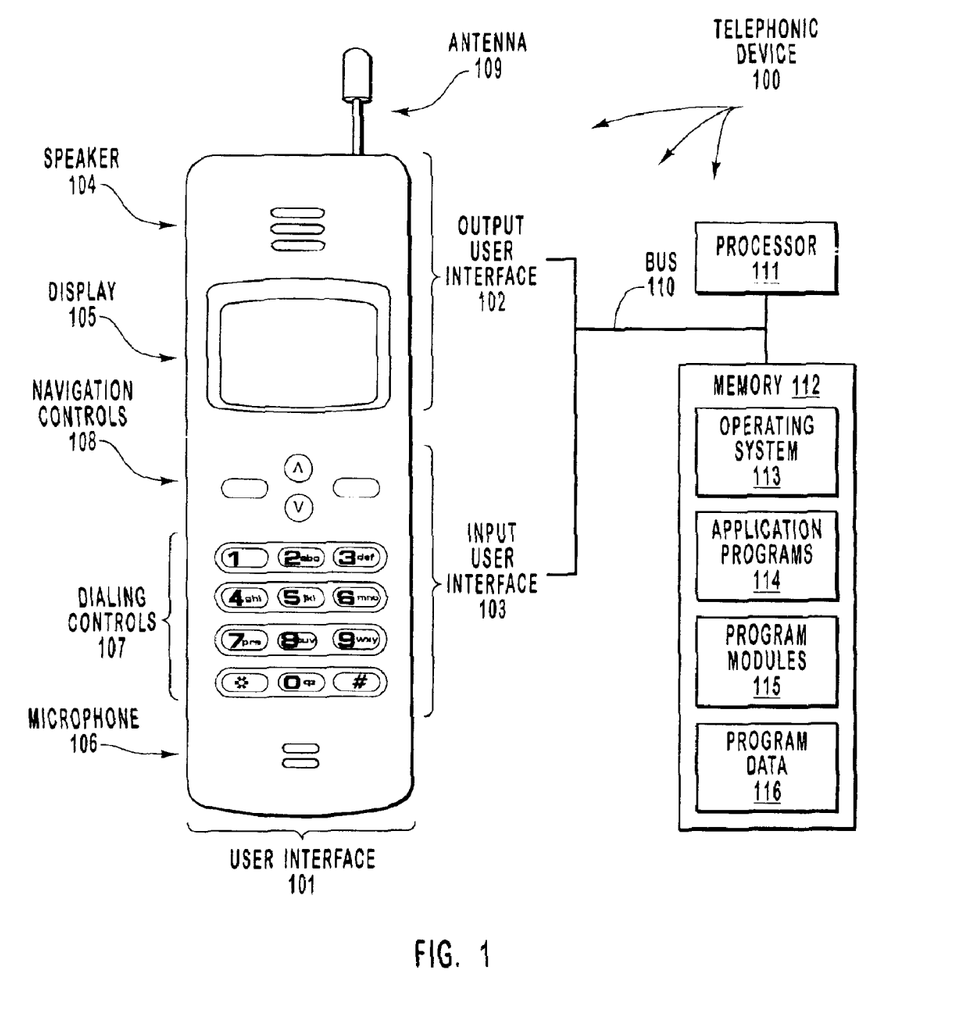
FIG. 1 illustrates an example of a telephonic device that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data a types. Computer-executable instructions, associated data structures, and program modules represent examples of the program code means for executing steps of the methods disclosed herein. The particular sequences of such executable instructions or associated data structures represent examples of corresponding acts for implementing the functions described in such steps.

With reference to FIG. 1, a suitable operating environment for the principles of the invention includes a general-purpose computer system in the form of telephonic device 100. The telephonic device 100 includes a user interface 101 for allowing a user to input information through an input user interface 103, and to review information presented via an output user interface 102. For example, the output user interface 102 includes a speaker 104 for presenting audio information to the user, as well as a display 105 for presenting visual information to the user. The telephonic device 100 may also have an antenna 109 if the telephonic device 100 has wireless capabilities.

The input user interface 103 may include a microphone 106 for translating audio information into electronic form. In addition, the input user interface 103 includes dialing controls 107 represented by 12 buttons through which a user may enter information. Input user interface 103 also includes navigation control buttons 108 that assist the user in navigating through various entries and options listed on display 105.

Although telephonic device 100 has the appearance of a mobile telephone, the unseen features of telephonic device 100 may allow for complex and flexible general-purpose processing capabilities. For example, telephonic device 100 also includes a processor 111 and a memory 112 that are connected to each other and to the user interface 101 via a bus 110. Memory 112 generally represents a wide variety of volatile and/or non-volatile memories and may include types of memory previously discussed. However, the particular type of memory used in telephonic device 100 is not important to the present invention. Telephonic device 100 may also include mass storage devices (not shown) similar to those associated with other general-purpose computer systems.

Program code means comprising one or more program modules may be stored in memory 112 or other storage devices as previously mentioned. The one or more program modules may include an operating system 113, one or more application programs 114, other program modules 115, and program data 116.

While FIG. 1 represents a suitable operating environment for the present invention, the principles of the present invention may be employed in any system that is capable of, with suitable modification if necessary, implementing the principles of the present invention. The environment illustrated in FIG. 1 is illustrative only and by no means represents even a small portion of the wide variety of environments in which the principles of the present invention may be implemented.

In this description and in the following claims, a "logical communication path" is defined as any communication path that may enable the transport of electric signals between two entities such as computer systems or modules. The actual physical representation of a communication path between two entities is not important and may change over time. A logical communication path may include portions of a system bus, a local area network, a wide area network, the Internet, combinations thereof, or portions of any other path that may facilitate the transport of electric signals. Logical communication paths may include hardwired links, wireless links, or a combination of hardwired links and wireless links. Logical communication paths may also include software or hardware modules that condition or format portions of data so as to make them accessible to components that implement the principles of the present invention. Such components may include, for example, proxies, routers, firewalls, or gateways. Logical communication paths may also include portions of a Virtual Private Network ("VPN").

In this description and in the following claims, a "voice connection" is defined as a connection between a first and second computer system where the first computer system receives audio signals and converts the audio signals to electrical signals, the electrical signals are transmitted from the first computer system to the second computer system, and the second computer system receives the electrical signals and converts the electrical signals to essentially the same audio signals that were received at the first computer system. To establish a voice connection, the first computer system may request establishment of a voice connection to the second computer system. Such a request may result, for example, when a user of the first computer system selects a telephone number associated with the second computer system. A request to establish a voice connection may include call establishment signals and/or call setup information, such as, for example, a Session Initiation Protocol ("SIP") invite or a Global System for Mobile Communications ("GSM") request for call establishment. The second computer system may accept the request (e.g. by a user of the second computer system answering in response to a ring indication) resulting in the establishment of a voice connection between the first and second computer systems. Alternately, the second computer system may deny the request by sending an appropriate signal, such as, for example, a busy signal, a timeout signal, or a termination signal and thus no voice connection results.

In this description and in the following claims, a "data connection" is defined as any connection between two computer systems that carries signals representing data. A data connection may be a session that maintains state information even when data is not be transferred between computer systems, such as, for example, a Transmission Control Protocol ("TCP") session. On the other hand, a data connection may not maintain state information and may be created on an ad hoc basis only when data is transferred between computer systems, such as, for example, when data is transferred using Short Messaging Service ("SMS").

In accordance with the present invention, input interface modules, voice interface modules, and data interface modules as well as associated data, including data of interest to a mobile computer system, may be stored and accessed from any of the computer-readable media associated with telephonic device 100. For example, portions of such modules and portions of associated program data may be included in operating system 113, application programs 114, program modules 115 and/or program data 116, for storage in memory 112. Portions of such modules and associated program data may also be stored in any of the mass storage devices previously described. Execution of such modules may be performed in a distributed environment as previously described.

Figure 2:
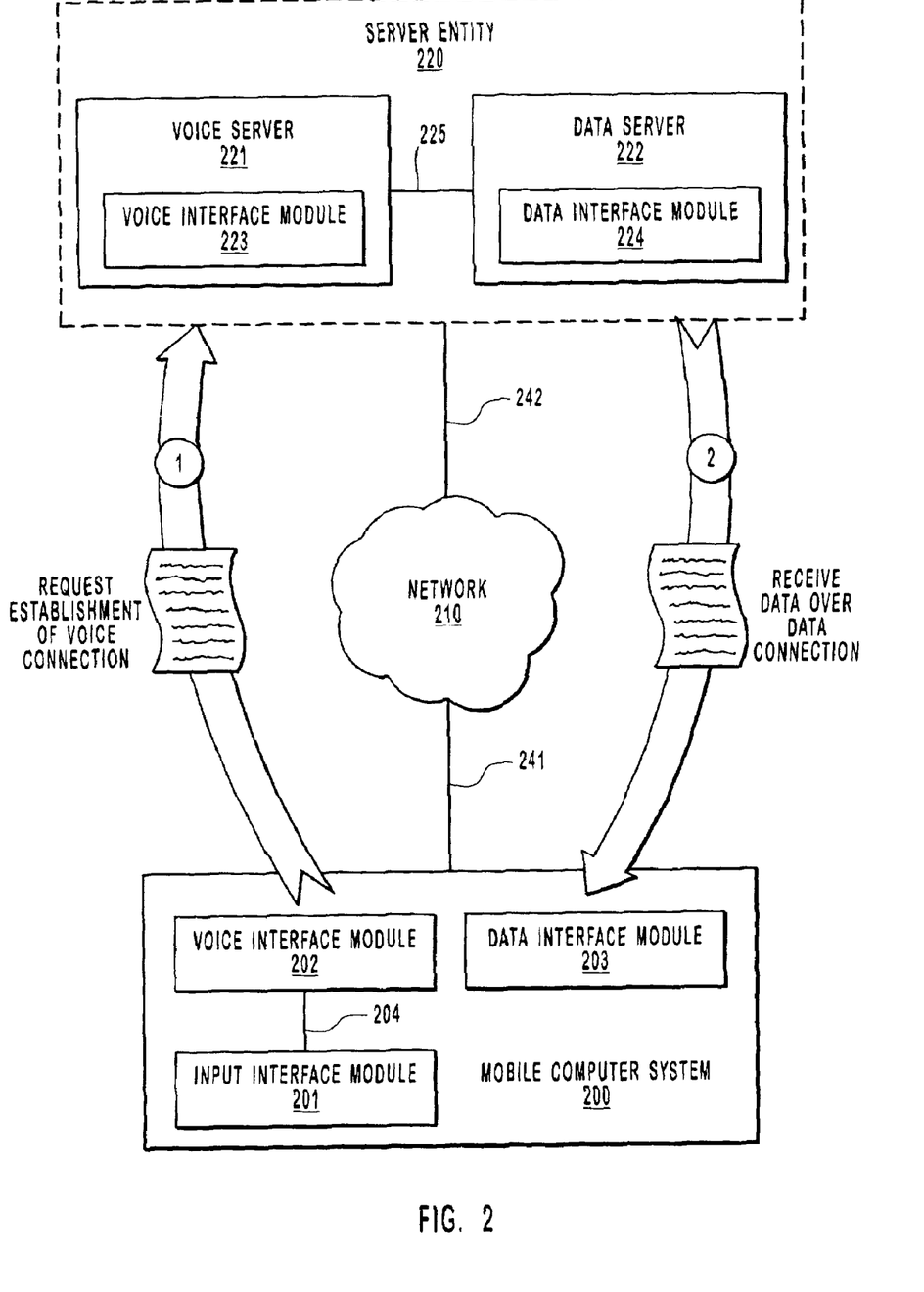
FIG. 2 illustrates an example of some of the functional components that may facilitate using call establishment signals to request data and identify data of interest based on call establishment signals.

FIG. 2 illustrates some of the functional components that may facilitate using call establishment signals to request data and identify data of interest based on received call establishment signals. Illustrated in FIG. 2 is a mobile computer system 200 that is capable of implementing the principles of the present invention. Mobile computer system 200 includes input interface module 201, which may be coupled to the input controls, such as, for example, dialing controls 107, navigational controls 108, or a real or virtual keyboard, of mobile computer system 200.

Mobile computer system 200 also includes voice interface module 202 and data interface module 203. Voice interface module 202 can receive instructions from other modules included in computer system 200, which cause voice interface module 202 to issue a request to establish a voice connection to another computer system. Voice interface 202 can also convert electrical signals received over an established voice connection into audio signals that are output at a speaker, such as, for example speaker 104. Further, voice interface 202 may convert audio signals received at a microphone, such as, for example, microphone 106, into electrical signals that are sent over an established voice connection.

Data interface 203 can receive data over a data connection so as to make the received data available to other modules in mobile computer system 200.

Logical communication path 241 represents a portion of a wireless network, such as, for example, a GSM network, a Time-Division Multiple Access ("TDMA") network, or an integrated Digital Enhanced Network ("iDEN"®). Logical communication path 242 represents a portion of a wired network, such as, for example, a Public Service Telephone Network ("PSTN"). Network 210 represents one or more network components that are used to interconnect the portion of the wireless network represented by logical communication path 241 to the portion of the wired network represented by logical communication path 242. Network 210 may include virtually any components that can address a computer system and request a voice channel to the computer system, such as, for example, components that address a computer system through Mobile Subscriber ISDN ("MSISDN") numbers, SIP Uniform Resource Identifiers ("URIs"), Internet Protocol ("IP"), and Domain Name Service ("DNS") hostnames. Network 210 may include components that convert addressing information between different formats, for example, from GSM MSISDN to PSTN MSISDN to SIP URI.

FIG. 2 also illustrates server entity 220, which includes voice server 221 and data server 222. Voice server 221 includes voice interface module 223, which receives requests from other computer systems to establish voice connections. Voice interface module 223 can also convert between electrical signals and audio signals and vice versa in a manner similar to voice interface module 202. Data server 222 includes data interface module 224, which can send data to other computer systems over data connections. Voice server 221 and data server 222 may be coupled to one another via logical communication path 225.

Figure 3:
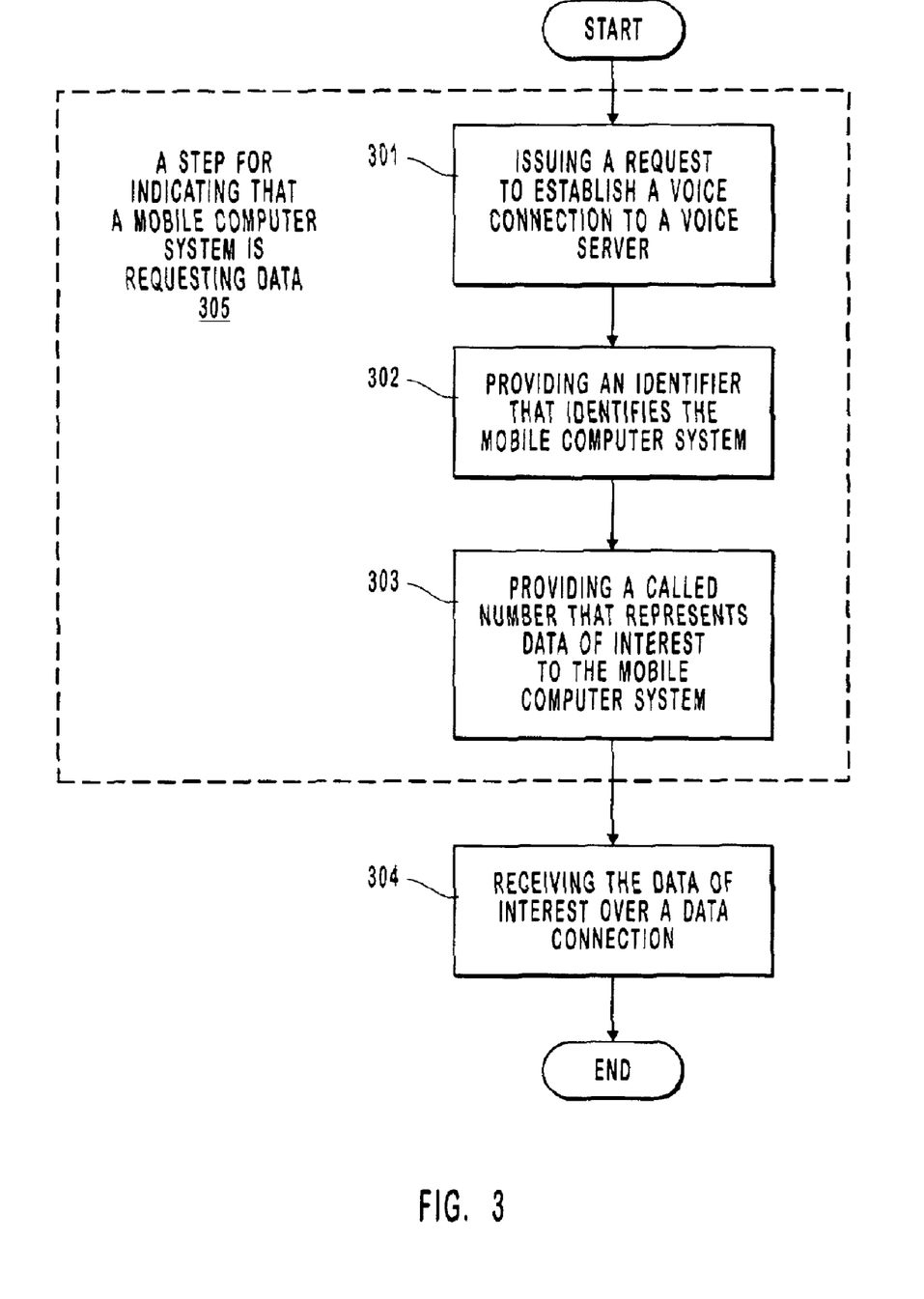
FIG. 3 is a flow diagram illustrating an example of a method for using call establishment signals to request data.

FIG. 3 is a flow diagram illustrating an example of a method for using call establishment signals to request data. The method in FIG. 3 will be discussed with reference to the functional components included in FIG. 2.

The method in FIG. 3 begins with a functional, result-oriented step for indicating that a mobile computer system is requesting data (step 305). Step 305 may include any corresponding acts for accomplishing the result of indicating that a mobile computer system is requesting data. However, in the illustrated example of FIG. 3, the step 305 includes a corresponding act of issuing a request to establish a voice connection to a voice server (act 301).

A request to establish a voice connection can occur as a result of selecting a telephone number at mobile computer system 200. A user of mobile computer system 200 may manipulate input controls, such as, for example, by selecting a series of individual keys from dialing controls or selecting a stored entry from a phone list/address book, to select a telephone number. Selecting a telephone number may cause commands to be sent from input interface module 201 and received at voice interface module 202 via logical communication path 204. Voice interface module 202 may interpret the received commands and cause mobile computer system 200 to issue a request to establish a voice connection to voice server 221.

The request may be transmitted over the portion of the wireless network represented by logical communication link 241. The request may be routed through the appropriate components of network 210 to the portion of the wired network represented by logical communication path 242. When the wired network is a PSTN network, the request may be routed through a PSTN/SIP gateway. As illustrated by arrow 1 in FIG. 2, mobile computer system 200 sends a request to server entity 220. In cases were a selected number is associated with voice server 221, server entity 220 causes the request to be routed to voice server 221.

In the illustrated example of FIG. 3, the step 305 also includes a corresponding act of providing an identifier that identifies the mobile computer system (act 302). An identifier may be included in caller identification information (e.g. an MSISDN number) that is appended to the request by some component included in logical communication link 241, network 210, or logical communication link 242. In alternate embodiments, a mobile computer system can expressly provide caller identification information or some other type of identifier, such as, for example, an electronic messaging address. An identifier may include a telephone number that represents mobile computer system 200.

In some embodiments, the identifier is implicitly included in the request to establish a voice connection. Thus, a receiving computer system, such as, for example, voice server 221 may receive the identifier without having to accept the request and establish an actual voice connection. As such, when an identifier is implicitly included in a request to establish a voice connection, mobile computer system 200 may receive an indication that the request to establish a voice connection was denied.

In other embodiments, the request to establish a voice connection is accepted and a voice connection results. For example, voice server 221 may accept a request to establish a voice connection that was sent from mobile computer system 200. After the voice connection is established, mobile computer system 200 sends an identifier, such as, for example, an authentication certificate, to voice server 221. A certificate may be used to identify mobile computer system 200 or a user associated with mobile computer system 200.

After voice server 221 receives an identifier, voice server 221 may "hang up" or otherwise terminate the voice connection.

In the illustrated example of FIG. 3, the step 305 also includes a corresponding act of providing a called number that represents data of interest to the mobile computer system (act 303). In some cases, mobile computer system 200 expressly includes the called number in the request to establish the voice connection. Thus, the called number is more easily identifiable to voice server 221. It may be that an identifier is represented by electrical characteristics or signals, such as, for example, call setup information associated with SIP or other signaling protocols. In other cases, a voice server may utilize a single number to receive requests for voice connections. In these other cases, a called number is provided implicitly just by issuing the request for a voice connection. A provided called number may represent data of interest that is stored at voice server 221 and/or data server 222. Data of interest may be identified based on a called number, a calling number, or the identity of a user.

In alternate embodiments, mobile computer system 200 may provide an identifier that identifies data of interest based on a calling number (e.g. an MSISDN number associated with mobile computer system 200) or based on the identity of a user associated with mobile computer system 200. Thus, in some cases, a single MSISDN number may be w utilized to identify both mobile computer system 200 and data of interest to mobile computer system 200.

The mobile computer system receives data of interest over a data connection (304). As illustrated in FIG. 2 by arrow 2, mobile computer system 200 receives data from server entity 220. A variety of different types of data connections may be used by mobile computer system 200 to receive data, such as, for example, SMS with MSISDN addressing, SMS with Simple Mail Transfer Protocol ("SMTP") addressing, Wireless Application Protocol ("WAP") Push with MSISDN addressing, WAP Push with IP addressing, Multimedia Messaging Service ("MMS"), or IP push.

Figure 4:
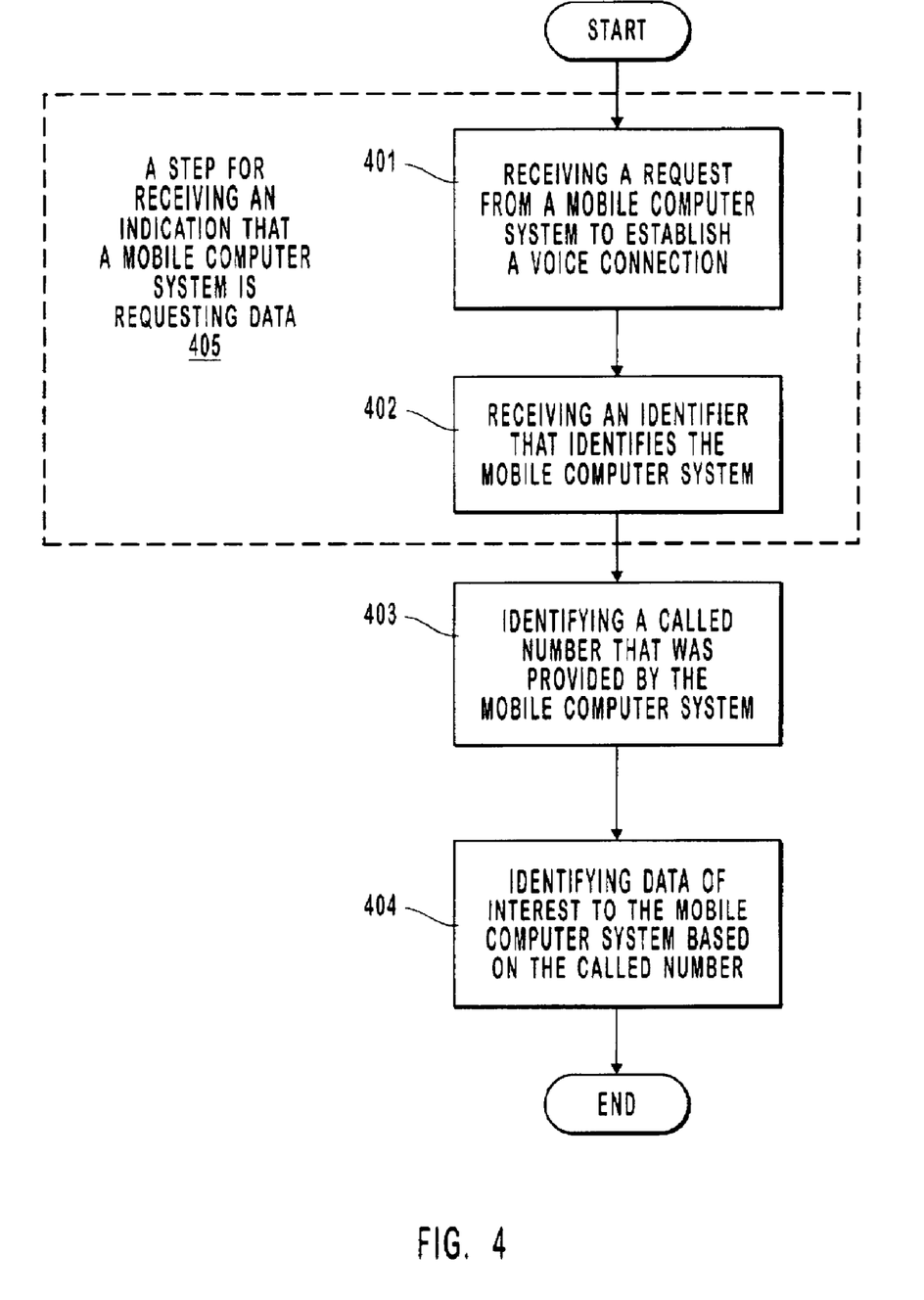
FIG. 4 is a flow diagram illustrating an example of a method for identifying data of interest based on received call establishment signals.

FIG. 4 is a flow diagram illustrating an example of a method for using call establishment signals to request data. The method in FIG. 4 will be discussed with reference to the functional components included in FIG. 2.

The method in FIG. 4 begins with a functional, result-oriented step for receiving an indication that a mobile computer system is requesting data (step 405). Step 405 may include any corresponding acts for accomplishing the result of receiving an indication that a mobile computer system is requesting data. However, in the illustrated example of FIG. 4, the step 405 includes a corresponding act of receiving a request from a mobile computer system to establish a voice connection (act 401).

Act 401 may include server entity 220 receiving a request to establish a voice connection as a result of a telephone number being selected at mobile computer system 200. Server entity 220 may cause the request to be routed to voice interface module 223. Voice interface module 223 may interpret electrical characteristics or signals, such as, for example, SIP call setup information, to determine that a request to establish a voice connection is being received. The received request may be transmitted over the portion of the wireless network represented by logical communication link 241. The request may be routed through the appropriate components of network 210 to the portion of the wired network represented by logical communication path 242. When the wired network is a PSTN network, the request may be routed through a PSTN/SIP gateway. A request to establish a voice connection may include a SIP invite. As illustrated by arrow 1 in FIG. 2, mobile server entity 220 receives a request from mobile computer system 200.

In the illustrated example of FIG. 4, the step 405 also includes a corresponding act of receiving an identifier that identifies the mobile computer system (act 402). An identifier can be caller identification information (e.g. an MSISDN number) that was received along with the request to establish the voice connection. The identifier may include a telephone number that represents mobile computer system 200. When a request to establish a voice connection is facilitated by SIP, caller identification information can be included in a SIP invite. In alternate embodiments, a received identifier may be an electronic messaging address.

A called number that was provided by the mobile computer system is identified (act 403). In some cases, voice server 221 identifies a called number that was expressly included in the request to establish the voice connection. Thus, the called number is more easily identifiable to voice server 221. It may be that an identifier is represented by electrical characteristics or signals, such as, for example, call setup information associated with SIP or other signaling protocols. In other cases, a voice server may utilize a single number to receive requests for voice connections. In these other cases, a called number is provided implicitly just by issuing the request for a voice connection. An identified called number may represent data of interest that is stored at voice server 221 and/or data server 222.

After receiving an identifier and identifying a called number, voice interface module 223 may accept the request from mobile computer system 200 to establish a voice connection and then hang up. Alternatively, voice interface module may deny the request by giving a busy signal or a timeout signal. When a request to establish a voice connection included a SIP invite, the request may be denied by sending any of the available SIP session termination messages.

Data of interest to the mobile computer system is identified based on the called number (act 404), for example, voice server 221 may identify data of interest to the mobile computer system 200 based on the called number. Data of interest may be identified by the address (e.g. a selected telephone number) the voice connection was requested to or setup to. A specific address may be indicative of a request for specific data, such as, electronic mail data, financial data, or instant messaging data. For example, a user of mobile computer system 200 may dial a specific telephone number associated with voice server 221 to request a current quote for a particular stock. In some cases, voice server 221 includes only one incoming address (e.g. only one telephone number) and thus all incoming calls are indicative of a request for the same type of data. Voice server 221 may identify data that is contained in voice server 221 or contained in another server, such as, for example, data server 222.

In alternate embodiments, voice server 221 may identify data of interest based on a provided identifier that identifies mobile computer system 200 or based on the identity of a user associated with mobile computer system 200. Voice server 221 may identify a user associated with mobile computer system 200 by processing data included in an authentication certificate received from mobile computer system 200. In some cases, the authentication certificate includes an MSISDN and the MSISDN is the only credential used to authenticate a mobile computer system or user. Voice server 221 may receive a request to establish a voice connection from mobile computer system 200, accept the request, thus causing a voice connection to be established, receive a certificate over the voice connection, and then terminate the voice the connection.

Voice server 221 may issue commands to cause data to be sent to mobile computer system 200 over a data connection. As illustrated by arrow 2 in FIG. 2, server entity 220 sends data over a data connection to mobile computer system 200. A variety of different types of data connections may be used by mobile server entity 220 to send data, such as, for example, SMS with MSISDN addressing, SMS with SMTP addressing, Wireless Application Protocol WAP Push with MSISDN addressing, WAP Push with IP addressing, MMS, or IP push. When identified data is contained in data server 222, voice server 221 may send commands to data server 222 via logical communication link 225. These commands may cause data interface module 224 to establish a data connection to data interface module 203. Data contained in data server 222 may be sent to mobile computer system 200 over the data connection.

In other embodiments (not shown), voice server 221 may include a data interface module. Voice server 221 may cause the data interface module contained in voice server 221 to establish a data connection to data interface module 203. In embodiments where voice server 221 includes a data interface module, voice server 221 can function as both a voice server and a data server. Thus, a single server may receive requests and identifiers and may identifier called numbers and data of interest.

When sending data to mobile computer system 200, server entity 220 may perform address mapping between a received identifier (e.g. an MSISDN number) and an address for data communication. A received identifier may be used directly to calculate an address for data communication and/or may be used to look up a corresponding data address in a database. In some embodiments, a table is maintained at voice server 221, data server 222, or some other server that manages addresses for data communication. The table contains a list of MSISDN numbers and corresponding IP addresses. The table may be maintained in a variety of manners.

In a first example embodiment, when mobile computer system 200 is powered on, rebooted, or otherwise reset in some manner, mobile computer system 200 registers an associated MSISDN number in the table and receives a corresponding IP address. Thus, data can be sent to mobile computer system 200 using either MSISDN addressing or IP addressing.

In a second example embodiment, the table is used to "lookup" a corresponding IP address at or near the time data is to be sent to mobile computer system 200. After data is sent, the IP address may be released and become available for use by other computer systems.

In a third example embodiment, IP addresses are dynamically allocated using a mechanism, such as for example, DNS, that matches an IP address to mobile computer system 200. When an IP address is matched to mobile computer system 200, the table is updated to show that the IP address is in use.

Requesting data through the use of call establishment signals may significantly reduce the input device manipulation and time needed to request data. A user need only dial a telephone number to request and subsequently receive data of interest to the user.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed is:

1. In a mobile computer system that can request the establishment of voice connections over a voice channel and can receive data over a data channel, a method for requesting data, comprising the following:

an act of issuing a request to establish a voice connection to a voice server;

an act of providing an identifier that identifies the mobile computer system;

an act of requesting data available at a specific IP address by providing a called number to the voice server at the same time the voice connection is established with the voice server, the called number corresponding to the data of interest that is available at the specific IP address; and an act of receiving the data of interest over a data connection.

2. The method as recited in claim 1, wherein an act of issuing a request to establish a voice connection to a voice server comprises the following:

an act of selecting a telephone number.

3. The method as recited in claim 1, wherein an act of issuing a request to establish a voice connection to a voice server comprises the following:

an act of issuing commands that cause a Session Initiation Protocol invite to be sent.

4. The method as recited in claim 1, wherein an act of issuing a request to establish a voice connection to a voice server comprises the following:

an act of issuing a request to establish a voice connection to a wireless network.

5. The method as recited in claim 1, wherein the act of providing an identifier that identifies the mobile computer system comprises the following:

an act of providing caller identification information that identifies the mobile computer system.

6. The method as recited in claim 5, wherein the act of providing caller identification information that identifies the mobile computer system comprises the following:

an act of providing an MSISDN number associated with the mobile computer system.

7. The method as recited in claim 1, wherein the act of providing a called number to the voice server comprises the following:

an act of implicitly providing the called number by selecting a telephone number the voice server utilizes to receive incoming telephone calls.

8. The method as recited in claim 1, wherein the act of providing a called number to the voice server comprises the following:

an act of providing call setup information.

9. The method as recited in claim 1, wherein the act of providing a called number to the voice server comprises the following:

an act of issuing commands to cause Session Initiation Protocol to provide the called number.

10. The method as recited in claim 1, wherein the act of providing a called number to the voice server comprises the following:

an act of including a called number within the request to establish the voice connection.

11. The method as recited in claim 1, wherein the act of receiving the data of interest over a data connection comprises the following:
an act of receiving data of interest at an address associated with the mobile computer system.

12. The method as recited in claim 1, wherein the act of receiving the data of interest over a data connection comprises the following:
an act of receiving data of interest from a data server associated with the voice server.

13. The method as recited in claim 1, further comprising:
an act of receiving an indication that the request to establish a voice connection was denied.

14. The method as recited in claim 13, wherein the act of receiving an indication that the request to establish a voice connection was denied comprises the following:
an act of a Session Initiation Protocol termination message causing an indication to the mobile computer system that the request to establish a voice connection was terminated.

15. In a mobile computer system that can request the establishment of voice connections over a voice channel and can receive data over a data channel, a method for requesting data, comprising the following:
a step for indicating that the mobile computer system is requesting data of interest that is available at a specific IP address by providing user input comprising a called number to a voice server, and without requiring additional input, so as to thereby reduce input required from a user of the mobile computer system; and
an act of receiving the data of interest that is available at the IP address over a data connection in response to providing the called number to the voice server.

16. In a voice server that can receive requests to establish a voice connection over a voice channel and that can cause data to be sent over a data connection, a method for identifying data, comprising the following:
an act of receiving a request from a mobile computer system to establish a voice connection;
an act of receiving an identifier that identifies the mobile computer system to the voice server;
an act of identifying a called number that was provided by the mobile computer system with the request to establish a voice connection, wherein the called number corresponds to data of interest that is available at a specific IP address that is associated with the called number; and
an act of identifying the data of interest at the specific IP address in response to identifying the called number and thereafter providing the data of interest to the mobile computer system based on the called number.

17. The method as recited in claim 16, wherein the act of receiving a request from a mobile computer system to establish a voice connection comprises the following:
an act of a receiving a Session Initiation Protocol invite for a voice connection.

18. The method as recited in claim 16, wherein the act of receiving a request from a mobile computer system to establish a voice connection comprises the following:
an act of a receiving a request to establish a voice connection that originated at a wireless network.

19. The method as recited in claim 16, wherein the act of receiving an identifier that identifies the mobile computer system to the voice server comprises the following:
an act of receiving caller identification information.

20. The method as recited in claim 19, wherein the act of receiving calling identification information comprises the following:
an act of receiving an MSISDN number associated with the mobile computer system.

21. The method as recited in claim 16, wherein the act of identifying a called number that was provided by the mobile computer system comprises the following:
an act of identifying a called number that was included in call setup information.

22. The method as recited in claim 16, wherein the act of identifying a called number that was provided by the mobile computer system comprises the following:
an act of identifying a called number by receiving a request to establish a voice connection at the only telephone number used by the voice server to receive incoming telephone calls.

23. The method as recited in claim 16, wherein the act of identifying a called a number that was provided by the mobile computer system comprises the following:
an act of including the called number in the request to establish the voice connection.

24. The method as recited in claim 16, wherein the act of identifying data of interest to the mobile computer system based on the called number comprises the following:
an act of corresponding the called number to data stored at a data server.

25. The method as recited in claim 16, further comprising:
an act of causing the data of interest to the mobile computer system to be sent to the mobile computer system.

26. The method as recited in claim 25, wherein the act of causing the data of interest to the mobile computer system to be sent to the mobile computer system comprises the following:
an act of mapping the received identifier to a data address associated with the mobile computer system.

27. The method as recited in claim 25, wherein the act of causing the data of interest to the mobile computer system to be sent to the mobile computer system comprises the following:
an act of causing a data server to send the data of interest.

28. The method as recited in claim 16, further comprising:
an act of denying the request to establish the voice connection.

29. The method as recited in claim 28, wherein the act of denying the request to establish the voice connection comprises the following:
an act of sending a Session Initiation Protocol termination message.

30. In a voice server that can receive requests to establish a voice connection over a voice channel and that can cause data to be sent over a data connection, a method for identifying data, comprising the following:
a step for receiving an indication that a mobile computer system is requesting data of interest;
an act of identifying a called number that was provided by the mobile computer system with the request for data, wherein the called number is associated with a specific IP address containing the data of interest; and
an act of identifying the data of interest at the specific IP address in response to identifying the called number and thereafter providing the data of interest to the mobile computer system based on the called number.

31. A computer program product for use in a mobile computer system that can request the establishment of voice connections over a voice channel, and can receive data over a data channel, the computer program product for implementing a method for requesting data, the computer program product comprising the following:

one or more computer-readable media carrying computer-executable instructions, that when executed at the mobile computer system, cause the mobile computer system to perform the method, including:

issuing a request to establish a voice connection to a voice server;

providing an identifier that identifies the mobile computer system;

requesting data available at a specific IP address by providing a called number to the voice server at the same time the voice connection is established with the voice server, the called number corresponding to the data of interest that is available at the specific IP address; and receiving the data of interest over a data connection.

32. The computer program product as recited claim 31, wherein the one or more computer-readable media include physical storage media.

33. The computer program product as recited claim 31, wherein the one or more computer-readable media include system memory.

34. A computer program product for implementing in a voice server that can receive requests to establish a voice connection over a voice channel and that can cause data to be sent over a data connection, the computer program product for implementing a method for identifying data, the computer program product comprising the following:

one or more computer-readable media carrying computer-executable instructions, that when executed at the voice server, cause the voice server to perform the method, including:

receiving a request from a mobile computer system to establish a voice connection;

receiving an identifier that identifies the mobile computer system to the voice server;

identifying a called number that was provided by the mobile computer system with the request to establish a voice connection, wherein the called number corresponds to data of interest that is available at a specific IP address that is associated with the called number; and identifying the data of interest at the specific IP address in response to identifying the called number and thereafter providing the data of interest to the mobile computer system based on the called number.

35. The computer program product as recited claim 34, wherein the one or more computer-readable media include physical storage media.

36. The computer program product as recited claim 34, wherein the one or more computer-readable media include system memory.

37. In a mobile computer system that can request the establishment of voice connections over a voice channel and can receive data over a data channel, a method for requesting data, comprising the following:

an act of requesting establishment of a voice connection to a voice server, and at the same time the mobile computer system automatically providing an identifier to the voice server that is associated with the mobile computer system and that is used to determine a specific IP address having data of interest that is associated with the mobile computer system, such that a user of the mobile computer system does not need to enter this identifier independently and subsequent to initiation a request to establish the voice connection; and an act of receiving the data of interest that is available at the specific IP address in response to providing the identifier identifying the mobile computer system, and without providing additional input, so as to thereby reduce input required from a user of the mobile computer system to access the data of interest available at the specific IP address from the mobile computer system.

38. In a voice server that can receive requests to establish a voice connection over a voice channel and that can cause data to be sent over a data connection, a method for identifying data, comprising the following:

an act of receiving an identifier from a mobile computer system during the establishment of a voice connection between the mobile computer system and the voice server, wherein the identifier is associated with the mobile computer system and corresponds to a specific IP data address having data of interest for a user of the mobile computer system;

an act of identifying the data of interest based on the identifier; and an act of causing the data of interest to be sent to the mobile computer system.

* * * * *

UNITED STATES PATENT AND TRADEMARK OFFICE
CERTIFICATE OF CORRECTION

PATENT NO. : 6,944,479 B2  Page 1 of 1
APPLICATION NO. : 10/179495
DATED : September 13, 2005
INVENTOR(S) : Kristian L. M. Andaker et al.

It is certified that error appears in the above-identified patent and that said Letters Patent is hereby corrected as shown below:

On the title page, item (56), under "Other Publications", in column 2, line 6, delete "Century(IEEE" and insert -- Century (IEEE --, therefor.

In column 5, line 15, after "data" delete "a".

In column 9, line 28, delete "w" before "utilized".

In column 14, line 21, in Claim 23, after "called" delete "a".

In column 15, line 3, in Claim 31, after "channel" delete ",".

In column 16, line 24, in Claim 37, delete "initiation" and insert -- initiating --, therefor.

Signed and Sealed this

First Day of September, 2009

David J. Kappos
*Director of the United States Patent and Trademark Office*